US007518671B2

(12) United States Patent
Maruta

(10) Patent No.: US 7,518,671 B2
(45) Date of Patent: Apr. 14, 2009

(54) PANEL DISPLAY TELEVISION AND PANEL DISPLAY DEVICE EACH COMPRISING FIRST AND SECOND SPACERS AT A CORNER OF A DISPLAY MODULE

(75) Inventor: Naoto Maruta, Osaka (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 215 days.

(21) Appl. No.: 11/405,296

(22) Filed: Apr. 17, 2006

(65) Prior Publication Data

US 2006/0232723 A1 Oct. 19, 2006

(30) Foreign Application Priority Data

Apr. 18, 2005 (JP) ............... 2005-002393 U

(51) Int. Cl.
*G02F 1/1333* (2006.01)
(52) U.S. Cl. .................................................. 349/58
(58) Field of Classification Search .............. 349/58, 349/60
See application file for complete search history.

(56) References Cited

U.S. PATENT DOCUMENTS 5,742,360 A * 4/1998 Kwon et al. ............... 348/839

| | | | |
|---|---|---|---|
| 6,536,855 B2 * | 3/2003 | Maruta | 312/7.2 |
| 6,560,124 B1 * | 5/2003 | Irie et al. | 361/816 |
| 6,747,713 B1 * | 6/2004 | Sato | 349/58 |
| 2003/0016489 A1 * | 1/2003 | Agata et al. | 361/683 |

FOREIGN PATENT DOCUMENTS

| JP | 4-9984 | 1/1992 |
|---|---|---|
| JP | 2001-305982 | 11/2001 |
| JP | 2005-45703 | 2/2005 |

* cited by examiner

*Primary Examiner*—Andrew Schechter
*Assistant Examiner*—Charles Chang
(74) *Attorney, Agent, or Firm*—Yokol & Co., U.S.A., Inc.; Peter Ganjan

(57) ABSTRACT

A liquid crystal panel 30 has its corners sandwiched between first and second spacers 70 and 80 forward and backward, and the first and second spacers 70 and 80 are fixed to a front cabinet 20. Thus, the front cabinet 20 can be used as a general-purpose member. That is, if the first spacer 70 or the second spacer 80 is designed to fit to the shape of the liquid crystal panel 30, the front cabinet 20 does not need to be modified every time the shape of the liquid crystal panel 30 is modified. Since the corners of the liquid crystal panel 30 are sandwiched on a flat part 71*a*1, even if the size of the liquid crystal panel 30 is changed, the first spacer 70 can cause the flat part 71*a*1 to be brought into contact with the corners of the liquid crystal panel 30.

8 Claims, 12 Drawing Sheets

PANEL DISPLAY TELEVISION AND PANEL DISPLAY DEVICE EACH COMPRISING FIRST AND SECOND SPACERS AT A CORNER OF A DISPLAY MODULE

The entire disclosure of Japanese Utility Model Application No.2005-2393, filed Apr. 18, 2005, is expressly incorporated by reference herein.

BACKGROUND OF THE INVENTION

1. Field of the Invention

The invention relates to a panel display television which includes a panel-like display module exposed forward from a substantially rectangular window provided in a front cabinet, and a panel display device having the display module.

2. Description of the Related Art

Conventionally, as this kind of panel display device, there has been known a panel display device which includes a display panel set in a proper position of a cabinet by a plurality of spacers, while being fixed by a pressing member, as disclosed in, for example, JP-A-305982/2001.

With this arrangement, even when the shape of the display panel is modified, only the modification of the pressing member and spacers enables the display panel to be attached to the proper position of the cabinet. That is, every time the display panel is modified, it is unnecessary to change the design of the cabinet, thereby achieving the general-purpose cabinet.

This arrangement, however, involves complicated processes of previously attaching a plurality of spacers to the cabinet and the display panel, and of setting and fixing the display panel by the pressing member so as to fix the display panel onto the cabinet.

BRIEF SUMMARY OF THE INVENTION

The invention has been accomplished in view of the foregoing problems, and it is an object of the invention to provide a panel display television and a panel display device which can attach a display module in a precise position by a simple process, while achieving a cabinet for the general-purpose use.

In order to achieve the object described above, in one aspect of the invention, a panel display device includes a panel-like display module exposed forward from a substantially rectangular window provided in a front cabinet. The panel display device comprises a boss provided outside a corner of the window in the front cabinet, a first spacer mountable to the boss and adapted to be brought into contact with the corner of the display module from a front side thereof, a second spacer adapted to be brought into contact with the corner of the display module from a rear side thereof, for sandwiching the corner of the display module together with the first spacer, and a screw adapted to be screwed into the boss, while fastening together the first and second spacers.

With this arrangement, in the panel display television according to the invention, the panel-like display module is exposed forward from the substantially rectangular window provided in the front cabinet. The boss is disposed outside the corner of the window in the front cabinet, and the first spacer is provided for being mountable to the boss. The first spacer is capable of being brought into contact with the corner of the display module from the front side thereof. Furthermore, the second spacer is provided for being capable of coming into contact with the corner of the display module from the rear side thereof, and can sandwich the corner of the display module forward and backward together with the first spacer.

The first and second spacers are fastened together with the screw which is screwed into the boss. That is, by screwing the screw into the boss, the display module sandwiched between the first and second spacers can also be fixed to the front cabinet, together with the first and second spacers.

Since the display module can be sandwiched between and fixed by the first and second spacers, the front cabinet may be configured not to contribute to the fixing of the displaying module. Thus, even when the shape of the display module is modified, the front cabinet can be used as a general-purpose member by appropriately adjusting the shape of the first or second spacer. It should be noted that accompanied by the modification of the shape of the display module, only the shape of the first or second spacer may be modified, or alternatively, the shapes of both spacers may be modified. Furthermore, since the first and second spacers are fastened together with the screw, the first spacer, the second spacer, and the display module do not need to be attached individually to the front cabinet, which leads to good workability.

According to the invention, a panel display television and a panel display device are provided which can attach the display module in the precise position by a simple process, while achieving the cabinet for the general-purpose use.

In another aspect of the invention, the first or second spacer may be provided with a guide part capable of being abutted against a side wall of the display module.

With this arrangement of the invention, the display module can be securely aligned with and fixed to the first or second spacer by providing the guide part which is capable of being abutted against the side wall of the display module, in the first or second spacer.

According to the invention, the display module can be fixed in the precise position.

More specifically, the first or second spacer may be provided with a fixed protrusion capable of being inserted into a recess formed on the display module.

With this arrangement of the invention, the display module can be fixed to the first or second spacer by providing the fixed protrusion which is capable of being inserted into the recess formed in the display module, in the first or second spacer.

According to the invention, the display module can be fixed securely.

Further, more specifically, the first spacer may be provided with a first mounting cylinder having a substantially cylindrical shape into which the boss protruded rearward is inserted.

With this arrangement of the invention, the boss is protruded rearward from the front cabinet, and the first spacer is provided with the first substantially cylindrical mounting cylinder, into which the boss is inserted. That is, the first spacer can be mounted on the front cabinet by inserting the boss into the first mounting cylinder.

According to the invention, the first spacer can be mounted on the front cabinet with a simple structure.

Further, more specifically, the second spacer may be provided with a second mounting cylinder having a substantially cylindrical shape, into which the first mounting cylinder protruded forward is inserted.

With this arrangement of the invention, the first mounting cylinder is protruded forward from the first spacer, and the second spacer is provided with the second substantially cylindrical mounting cylinder into which the first mounting cylinder is inserted. That is, the second spacer can be mounted on the first spacer by inserting the first mounting cylinder into the second mounting cylinder. Thus, the first spacer mounted on the front cabinet, and the second spacer mounted on the first spacer can be fastened together with the screw.

According to the invention, the second spacer can be mounted on the first spacer with a simple structure, preventing the displacement of spacers in fastening.

Further, more specifically, a pair of the first and second spacers may be provided with three sets of the bosses, the first and second mounting cylinders, and the screws.

With this arrangement of the invention, the three sets of the bosses, the first and second mounting cylinders, and the screws are provided for mounting and fastening together the first and second spacers opposed to each other. That is, the first and second spacers can be fixed at three points of the front cabinet.

The invention can fix the display module stably, while enhancing the strength of fixing.

In addition, more specifically, a connection line connecting the three bosses provided in the pair of the first and second spacers may form a substantially L shape along the corner of the window.

With this arrangement of the invention, the three bosses are provided in the first and second spacers opposed to each other. These bosses are arranged such that the connection line interconnecting the adjacent three bosses form the substantially L shape along the corner of the window. That is, the fixing with the screw can be carried out by the three bosses such that the corners of the display module are surrounded from the outside.

According to the invention, the display module can be fixed stably.

Further, more specifically, four pairs of the first and second spacers may be respectively provided at the four corners of the window.

With this arrangement of the invention, the first and second spacers opposed to each other are provided at the four corners of the substantially rectangular window. Thus, the display module can be fixed such that its four corners are surrounded from the outside.

According to the invention, the display module can be firmly fixed.

Additionally, more specifically, the first or second spacer may be made of synthetic resin.

With this arrangement of the invention, when the shape of the first or second spacer needs to be modified accompanied by the change or displacement of the display module, the change in design of the shape of the spacer can be carried out with flexibility if the spacer is made of synthetic resin.

The invention can deal with the modification of the display module with flexibility.

Based on the arrangement as described above, the invention provides a panel display television including a panel-like display module exposed forward from a substantially rectangular window provided in a front cabinet.

The panel display television includes bosses provided in the front cabinet, three bosses being protruded rearward outside each of four corners of the window of the front cabinet in a columnar shape, a connection line connecting the adjacent bosses being in a substantially L shape along the corner. The panel display television also includes a first spacer mounted at each of the four corners of the window. The first spacer includes three first mounting cylinders having a substantially cylindrical shape and protruded rearward at each corner, into which the three bosses disposed at each corner are respectively inserted. The first spacer is made of synthetic resin and adapted to be brought into contact with the corner of the display module from a front side thereof. The panel display television further includes a second spacer provided corresponding to each of the first spacers disposed at the four corners of the window. The second spacer includes second mounting cylinders having a substantially cylindrical shape and protruded forward, into which the three first mounting cylinders disposed in the first spacer opposed to the second spacer are respectively inserted, a guide part capable of being abutted against a side wall of the display module, and a fixed protrusion capable of being inserted into a recess formed on the display module. The second spacer is made of synthetic resin, and adapted to be brought into contact with the corner of the display module from a rear side thereof, and thereby sandwiching the corner of the display module together with the first spacer opposed thereto. The panel display television further includes screws adapted to be screwed into the bosses, while fastening together the first and second spacers opposed to each other.

Also, with this specific arrangement, the same effect as that of the panel display device of the invention as described above can be produced.

The invention can provide the panel display television and the panel display device which can attach the display module in the precise position by the simple process, while achieving the cabinet for general purpose use.

These and other features, aspects, and advantages of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

Referring to the drawings in which like reference character(s) present corresponding parts throughout.

DETAILED DESCRIPTION OF THE INVENTION

The detailed description set forth below in connection with the appended drawings is intended as a description of presently preferred embodiments of the invention and is not intended to represent the only forms in which the present invention may be constructed and or utilized.

Reference will now be made to preferred embodiments of the invention in the following order:

(1) Entire Structure of Liquid Crystal Television;

(2) Attachment Structure of Liquid Crystal Module; and (3) Overview.

(1) Entire Structure of Liquid Crystal Television

Figure 1:
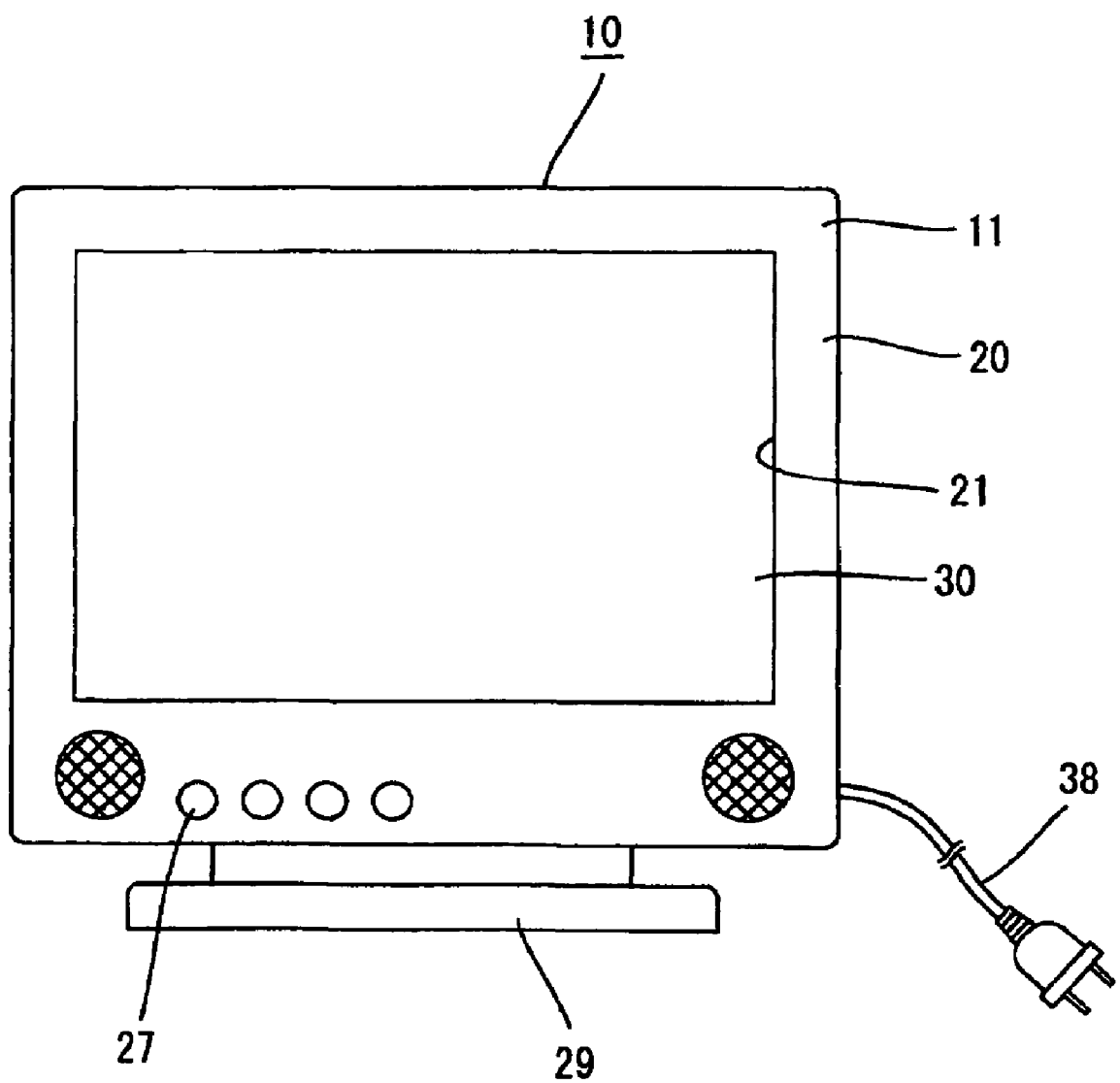
FIG. 1 is an exemplary illustration of a front view of a liquid crystal television according to one preferred embodiment of the invention.

Now, a liquid crystal television as a panel display television according to one preferred embodiment of the invention will be described in detail. FIG. 1 illustrates a liquid crystal television 10 as viewed from a front face thereof. As shown in the figure, the liquid crystal television 10 includes a cabinet 11, a liquid crystal panel 30 serving as a display panel having a substantially rectangular plate-like shape, and a leg part 29. A window 21 is formed in the center of a front cabinet 20 constituting a front part of the cabinet 11, and the front cabinet 20 has a rectangular frame-like shape.

The liquid crystal panel 30 disposed on a back side of the front cabinet 20 is exposed forward from the window 21. Under the front cabinet 20, an operation switch 27 is provided for performing a power supply operation, and a channel operation. The leg part 29 supports the cabinet 11, thereby causing the liquid crystal television 10 to stand up, so that a display surface of the liquid crystal panel 30 is oriented in a substantially vertical direction. Note that unless otherwise specified below, the direction taken by the liquid crystal television 10 when it stands up will be used as a reference in the following explanation.

Figure 2:
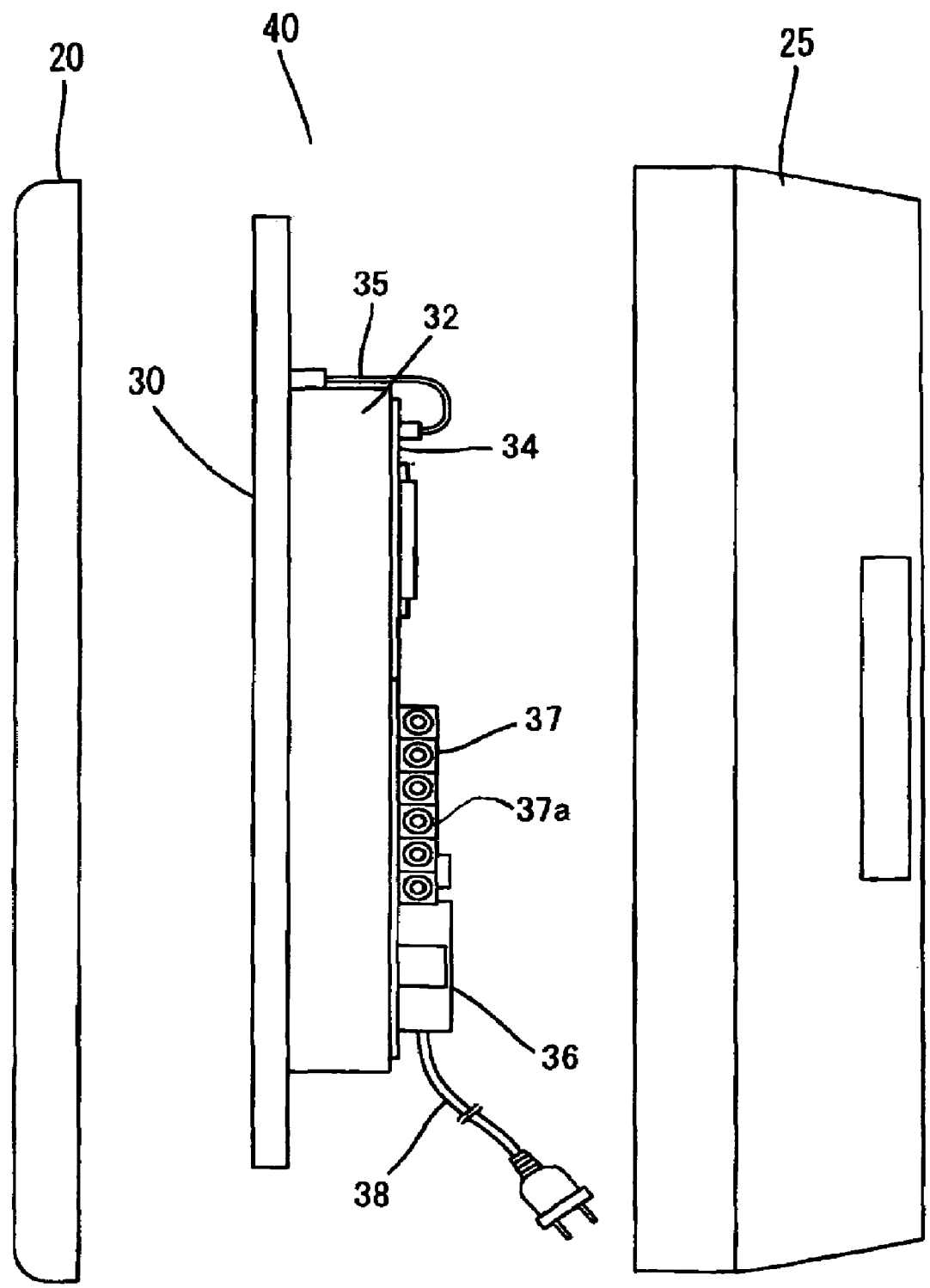
FIG. 2 is an exemplary illustration of an exploded side view of the liquid crystal television.

FIG. 2 illustrates exploded parts of the liquid crystal television 10 as viewed from the side thereof. As shown in the figure, the front cabinet 20 constituting the front part of the cabinet 11, and a back side cabinet 25 constituting the rear part thereof are disposed forward and backward, respectively. A liquid crystal module 40 is sandwiched and disposed between these cabinets. The liquid crystal panel 30 constituting the display panel of the embodiment is attached onto the front side of the liquid crystal module 40 with its display surface exposed forward. On the other hand, a metal protective cover 32 is attached to the rear side of the liquid crystal module 40. The protective cover 32 protects the back side of the liquid crystal panel 30 attached to the liquid crystal module 40, while receiving therein various electric members, such as a backlight disposed on the back side. A video output substrate 34 is provided on the rear side of the protective cover 32. A video output terminal of the video output substrate 34 is connected to the liquid crystal panel 30 via a flat cable 35.

A tuner substrate 37 is further provided on the rear side of the liquid crystal module 40, allowing an input terminal 37a, such as an antenna input, or a composite input, to be oriented toward the side thereof. A power supply substrate 36 is provided on the back of the tuner substrate 37 with respect to a surface of a sheet of the drawing, for converting the power supplied from a power supply cable 38 into power usable in each component of the liquid crystal television 10, and for outputting the converted power to each component. As mentioned above, since the liquid crystal module 40 previously incorporates therein various members 30, 32, 34, 35, and 36, these members can be dealt with as a single piece. In assembling the liquid crystal television 10, the liquid crystal module 40 previously assembled integrally is attached to the front cabinet 20, and then the back side cabinet 25 is fixed to the front cabinet 20.

(2) Attachment Structure of Liquid Crystal Module

Figure 3:
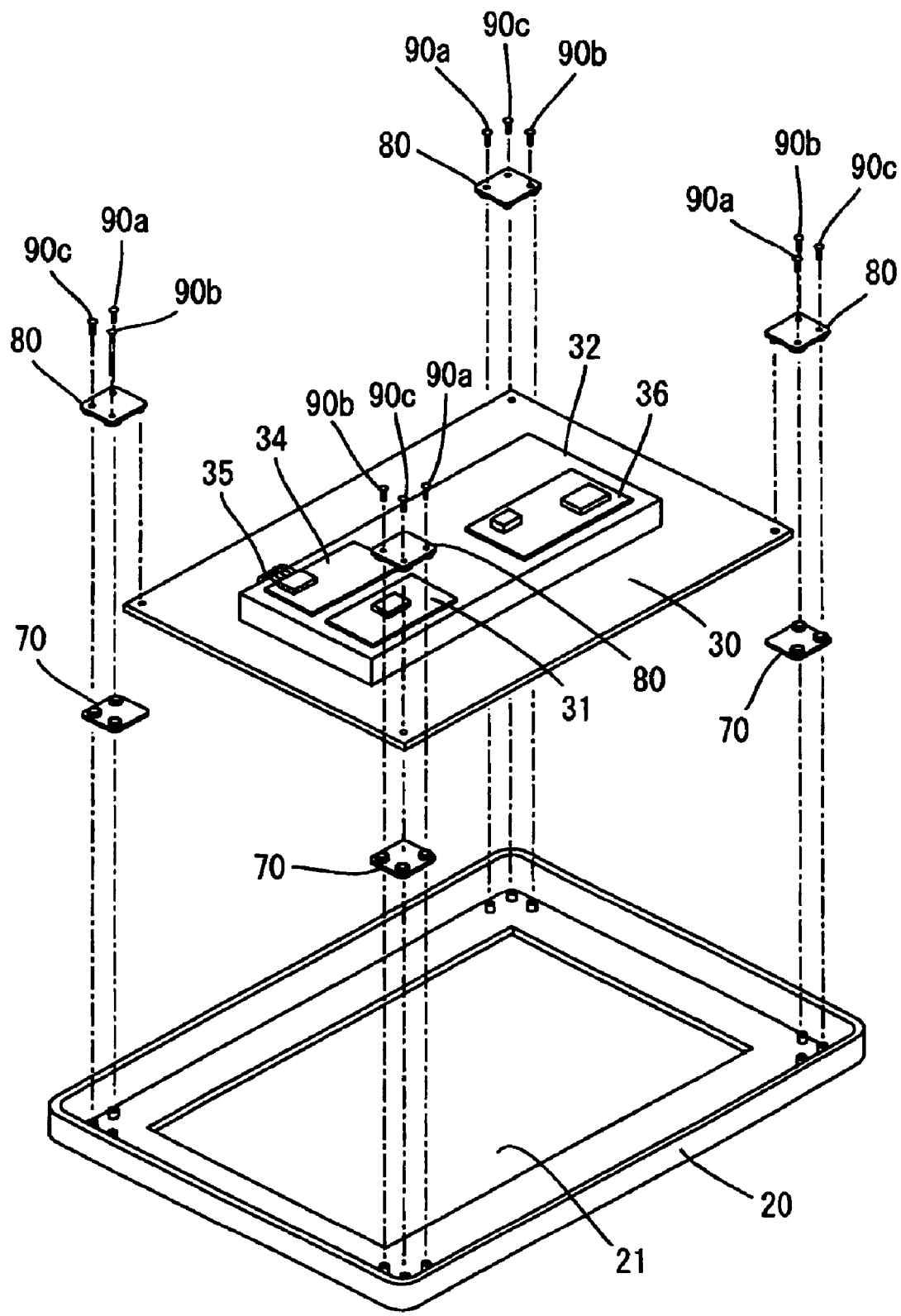
FIG. 3 is an exemplary illustration of a diagram explaining the attachment of a liquid crystal module.

The process and structure for attachment of the liquid crystal module 40 to the front cabinet 20 will be described below in detail. FIG. 3 illustrates the attachment of the liquid crystal module 40 to the front cabinet 20. As shown in the figure, the liquid crystal module 40 is set to the front cabinet 20 such that the peripheral edge of the liquid crystal panel 30 having width and height greater than those of the window 21 of the front cabinet 20 is brought into contact with the front cabinet 20. This enables the center part of the liquid crystal panel 30 to be exposed forward from the window 21, so that a display condition of the liquid crystal panel 30 can be seen from the front side thereof. In a state where the peripheral edge of the liquid crystal panel 30 is in contact with the front cabinet 20, the liquid crystal panel 30 is fixed to the front cabinet 20. This allows the liquid crystal module 40 to be fixed to the front cabinet 20.

In fixing the liquid crystal module 40 to the front cabinet 20, are used four first spacers 70, 70, 70, and 70 disposed at four corners of the liquid crystal panel 30, and second spacers 80, 80, 80, and 80 which are opposed to the first spacers 70, 70, 70, and 70. More specifically, the first spacers 70, 70, 70 and 70 are previously mounted on the front cabinet 20, and then the liquid crystal module 40 is put on the front cabinet 20 from the rear side thereof. The second spacers 80, 80, 80, and 80 are mounted at four corners of the liquid crystal module 40 put on the front cabinet 20 so as to cover the four corners of the module from the rear side thereof. The first spacers 70, 70, 70, and 70, and the second spacers 80, 80, 80, and 80 opposed to one another are fastened and fixed together with respective three of screws 90a, 90b, 90c, 90a, 90b, 90c, 90a, 90b, 90c, 90a, 90b, and 90c. It should be noted that the liquid crystal module 40 is attached in a state where the front cabinet 20 is laid with its front surface facing downward.

Figure 4:
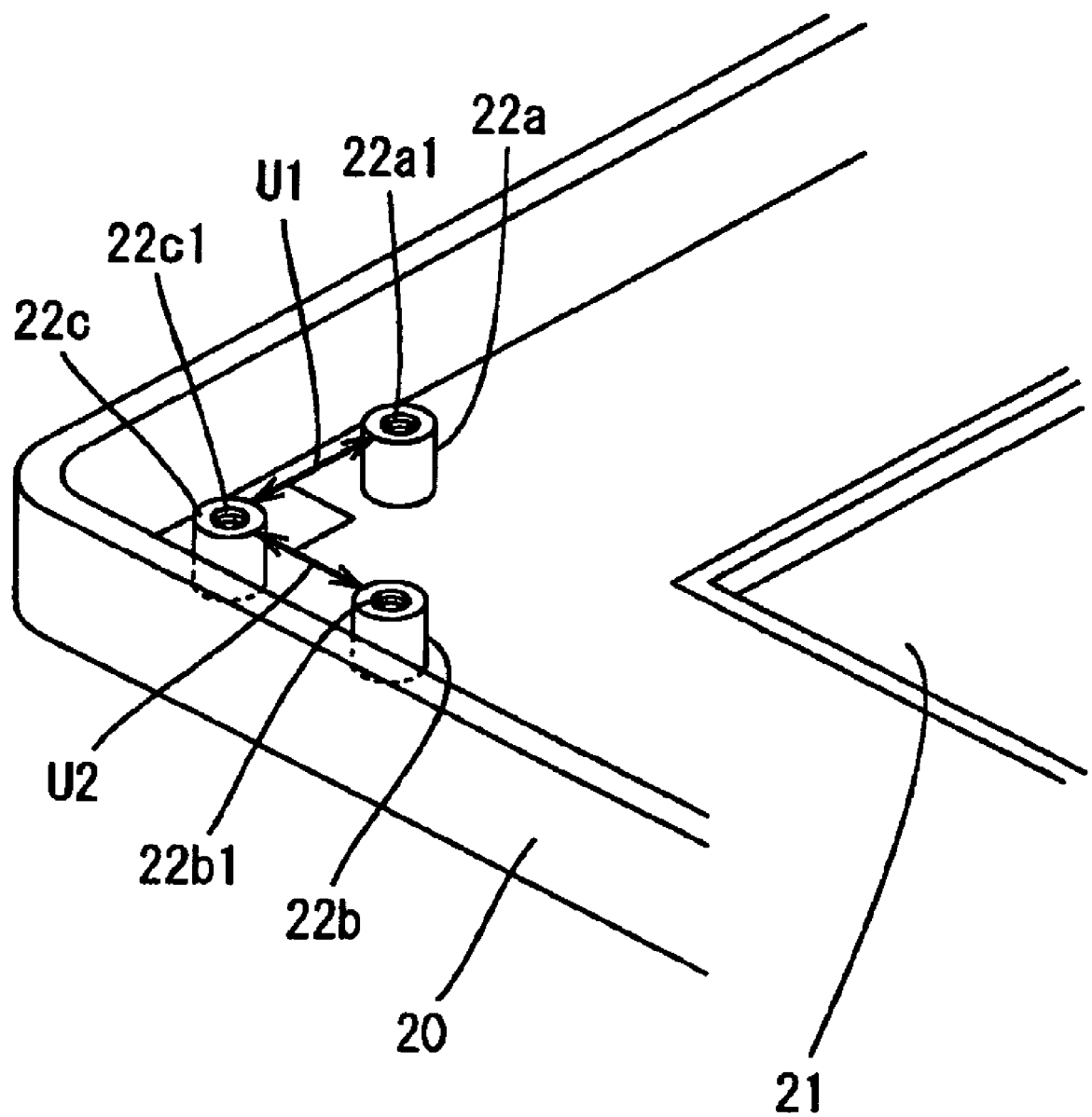
FIG. 4 is an exemplary illustration of a rear perspective view of a front cabinet.

FIG. 4 illustrates the corner of the window 21 of the front cabinet 20 as viewed from the diagonally rear side. In the figure, the upper right corner of the window 21 (the front view of which is a basis, in the same manner as below) is shown. The front cabinet 20 is formed in a substantially plate-like shape, and the rectangular window 21 is formed by removing the center part of the front cabinet. In an area outside the corner of the window 21 by a predetermined distance, three bosses 22a, 22b, and 22c are protruded rearward. The bosses 22a, 22b, and 22c are formed in a cylindrical shape in such a manner that directions of their axes are oriented forward and backward, and cylindrical screw holes 22a1, 22b1, and 22c1 are formed in the center of the respective bosses, the directions of axes of the holes being also oriented forward and backward. On the respective side walls of the screw holes 22a1, 22b1, and 22c1, helical threads are formed such that the helical directions of these threads are oriented forward and backward.

The boss 22a is protruded from the upper outside of an upper side of the window 21 at the left corner of the window 21, whereas the other boss 22b is protruded from a left outer part of a left side of the window 21. The boss 22c further stands up on the right upper outside of an edge of the window 21 at the left corner of the window 21. When connection lines U1 and U2 connecting the adjacent bosses 22a, 22b, and 22c are drawn, the connection lines U1 and U2 intersect at a substantially right angle so that an L-shaped line can be drawn outside and along the right upper corner of the window 21.

Figure 5:
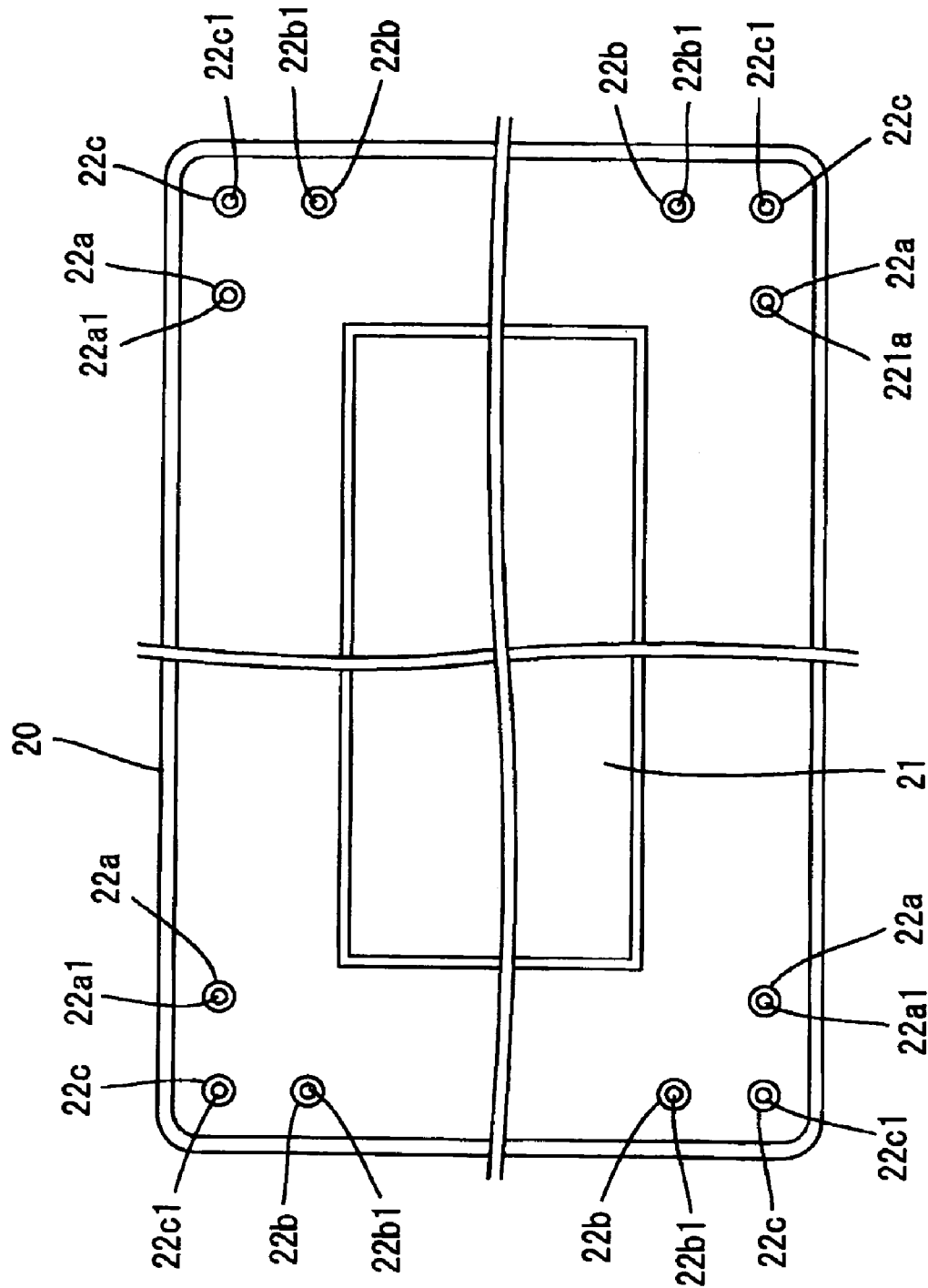
FIG. 5 is an exemplary illustration of a back view of the front cabinet.

FIG. 5 illustrates four corners of the front cabinet 20 as viewed from the rear side thereof. As shown in the figure, also at each of the left upper corner, the left lower corner, and the right lower corner of the window 21, three bosses 22a, 22b, and 22c are further formed. These bosses 22a, 22b, and 22c positioned at the left upper, left lower, and right lower corners are arranged symmetrically with respect to the bosses 22a, 22b, and 22c positioned at the right upper corner as shown in FIG. 4. The bosses 22a, 22b, and 22c positioned at the left upper, left lower, and right lower corners have the same shape as that of the bosses 22a, 22b, and 22c positioned at the right upper corner as shown in FIG. 4.

Figure 6:
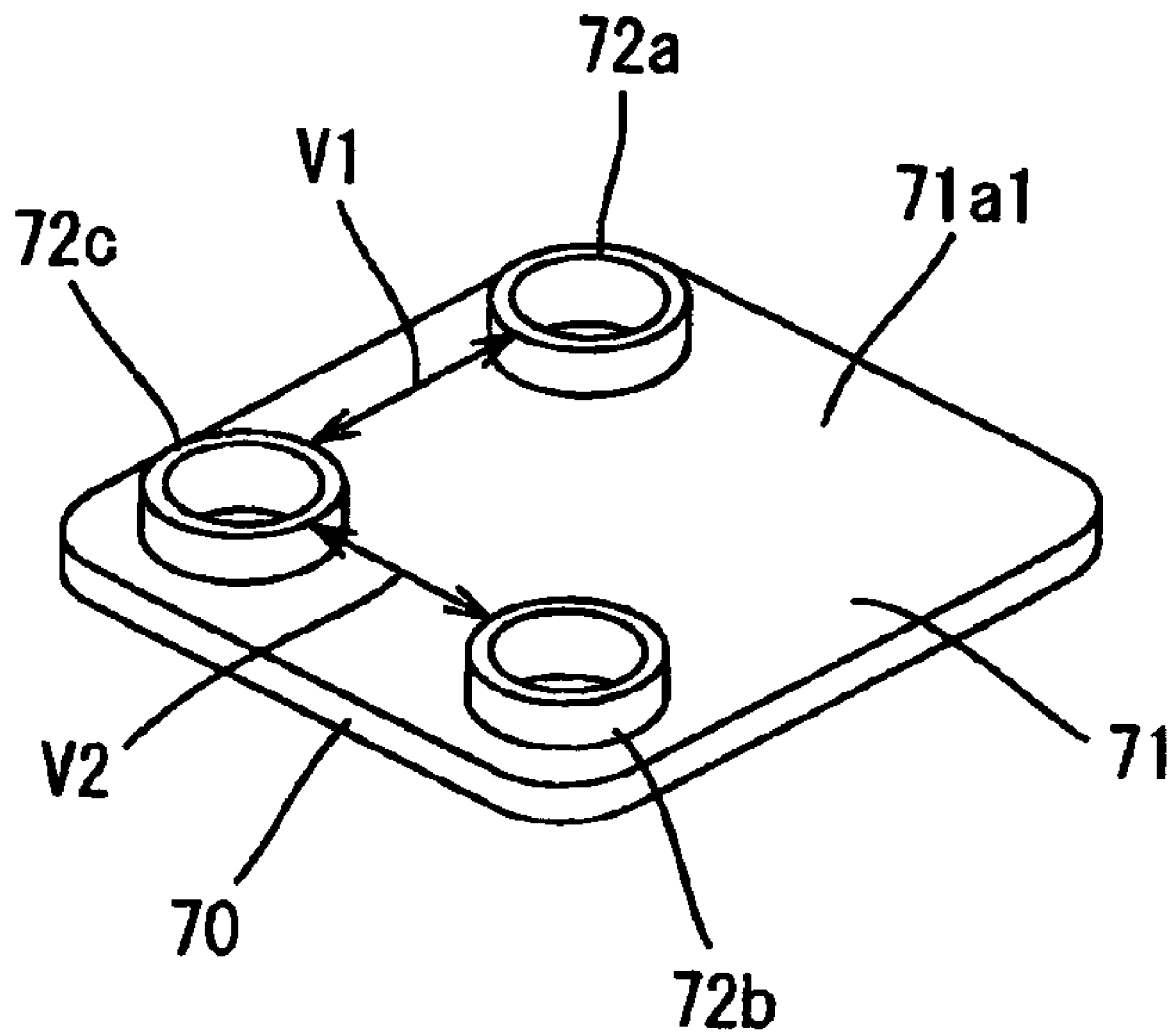
FIG. 6 is an exemplary illustration of a perspective view of a first spacer.

FIG. 6 is a perspective view showing one of the first spacers 70, 70, 70 and 70, which is attached to the outside of the right upper corner of the window 21. As shown in the figure, the first spacer 70 includes a plate part 71 having a rectangular plate-like shape, and three first mounting cylinders 72a, 72b, and 72c are protruded rearward from the plate part 71. The first mounting cylinders 72a, 72b, and 72c, each of which is formed in a cylindrical shape, have through holes formed inside, each of which has an inner diameter slightly larger than an outer diameter of each of the bosses 22a, 22b, and 22c. The first spacer 70 is molded of synthetic resin. The first mounting cylinders 72a, 72b, and 72c are arranged such that connection lines V1 and V2 form a substantially L shape, in the same arrangement as that of the bosses 22a, 22b, and 22c, and such that a distance between the cylinders is the same as that between the bosses.

Thus, a flat part 71a1 is formed between the first mounting cylinder 72a and the first mounting cylinder 72b on the plate part 71.

Figure 7:
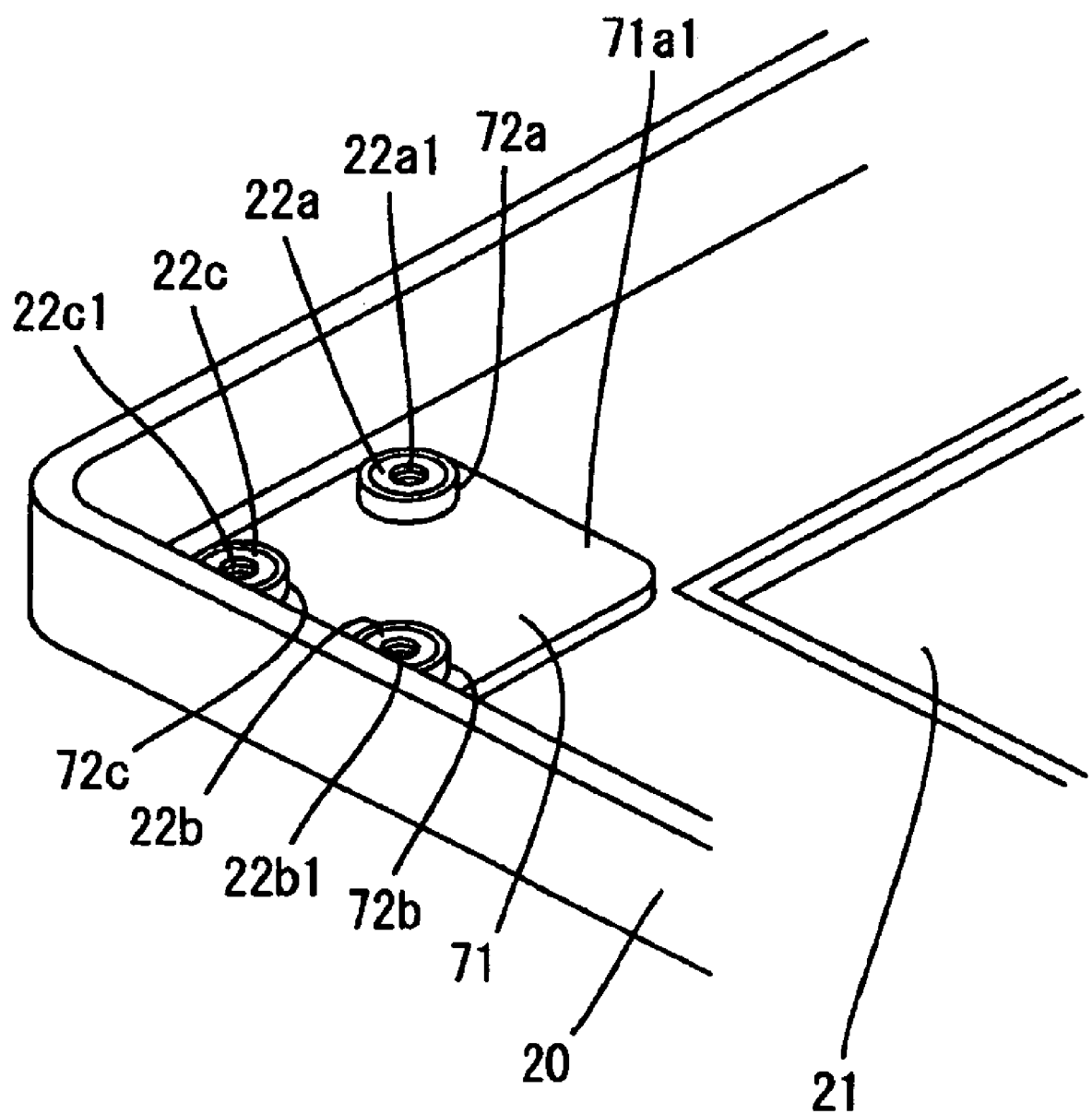
FIG. 7 is an exemplary illustration of another rear perspective view of the front cabinet.

FIG. 7 illustrates a state in which the first spacer 70 is mounted on the right upper corner of the window 21 of the front cabinet 20. As shown in the figure, the bosses 22a, 22b, and 22c are respectively inserted into the first mounting cylinders 72a, 72b, and 72c. The first mounting cylinders 72a, 72b, and 72c of the first spacer 70 are positioned outside the window 21, and the flat part 71a1 is positioned in the vicinity of the right upper corner of the window 21. Since the liquid crystal module 40 is attached in a state where the front cabinet 20 is laid with its front surface facing downward, the first spacer 70 can be mounted by inserting the bosses 22a, 22b, and 22c oriented upward into the spacer 70. In attachment of the liquid crystal module 40, the first spacer 70 is not disengaged from the front cabinet 20, even though the first spacer is not fixed with screws or the like.

Figure 8:
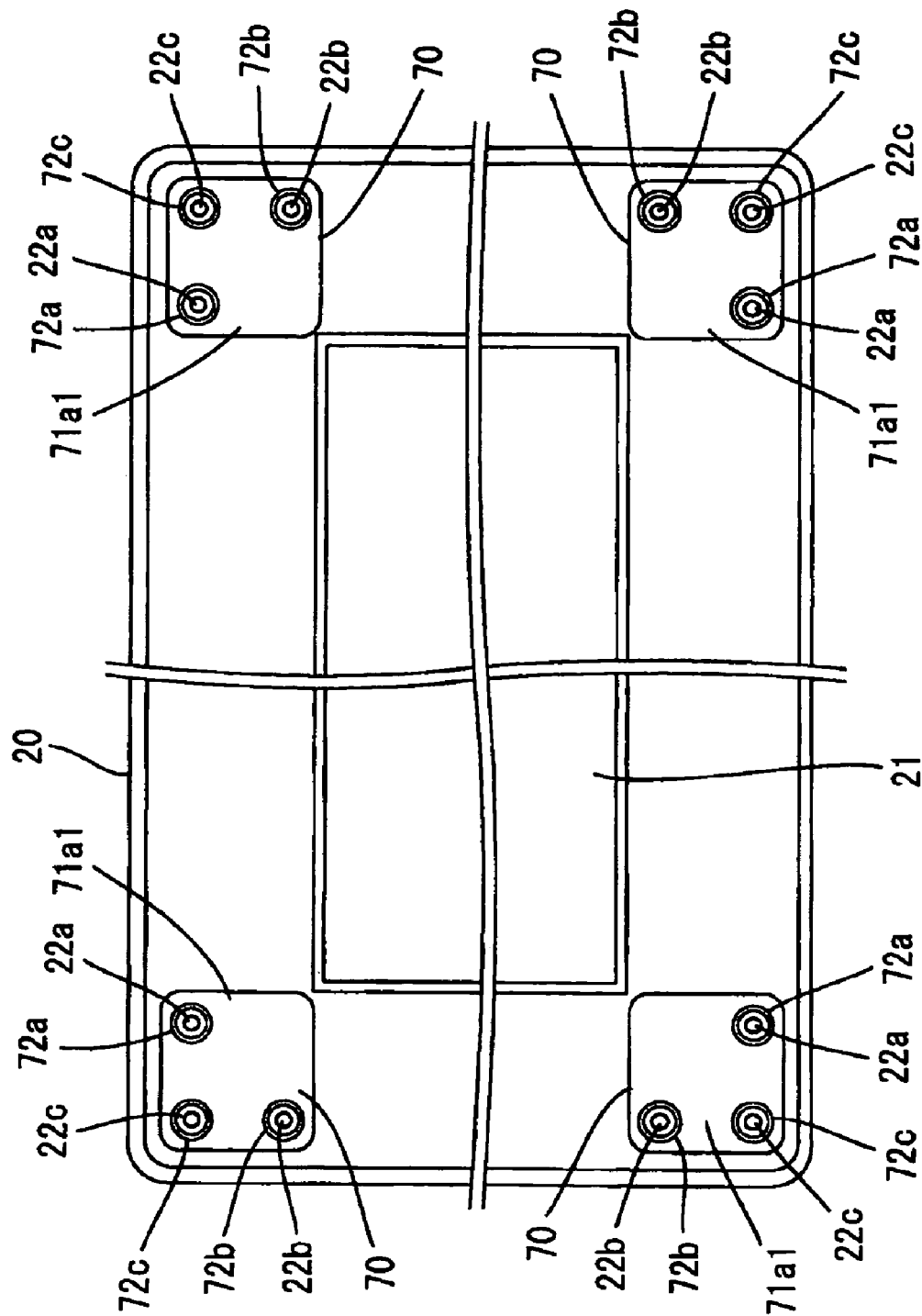
FIG. 8 is an exemplary illustration of another back view of the front cabinet.

FIG. 8 illustrates a state in which the first spacers 70, 70, 70, and 70 are mounted on the front cabinet 20 outside the four corners of the window 21. As shown in the figure, the first spacers 70, 70, 70 and 70 which are formed in a symmetrical shape are mounted in symmetrical directions that orient these spacers symmetrically to one another. And the respective flat parts 71a1, 71a1, 71a1 and 71a1 are oriented toward the vicinity of the four corners of the window 21. It should be noted that the first spacers 70, 70, 70 and 70 are attached outside the window 21 in such a degree that the flat parts 71a1, 71a1, 71a1 and 71a1 do not extend off into the window 21. Thus, the first spacers 70, 70, 70 and 70 are visible from the front side via the window 21, which does not result in a bad appearance.

Figure 9:
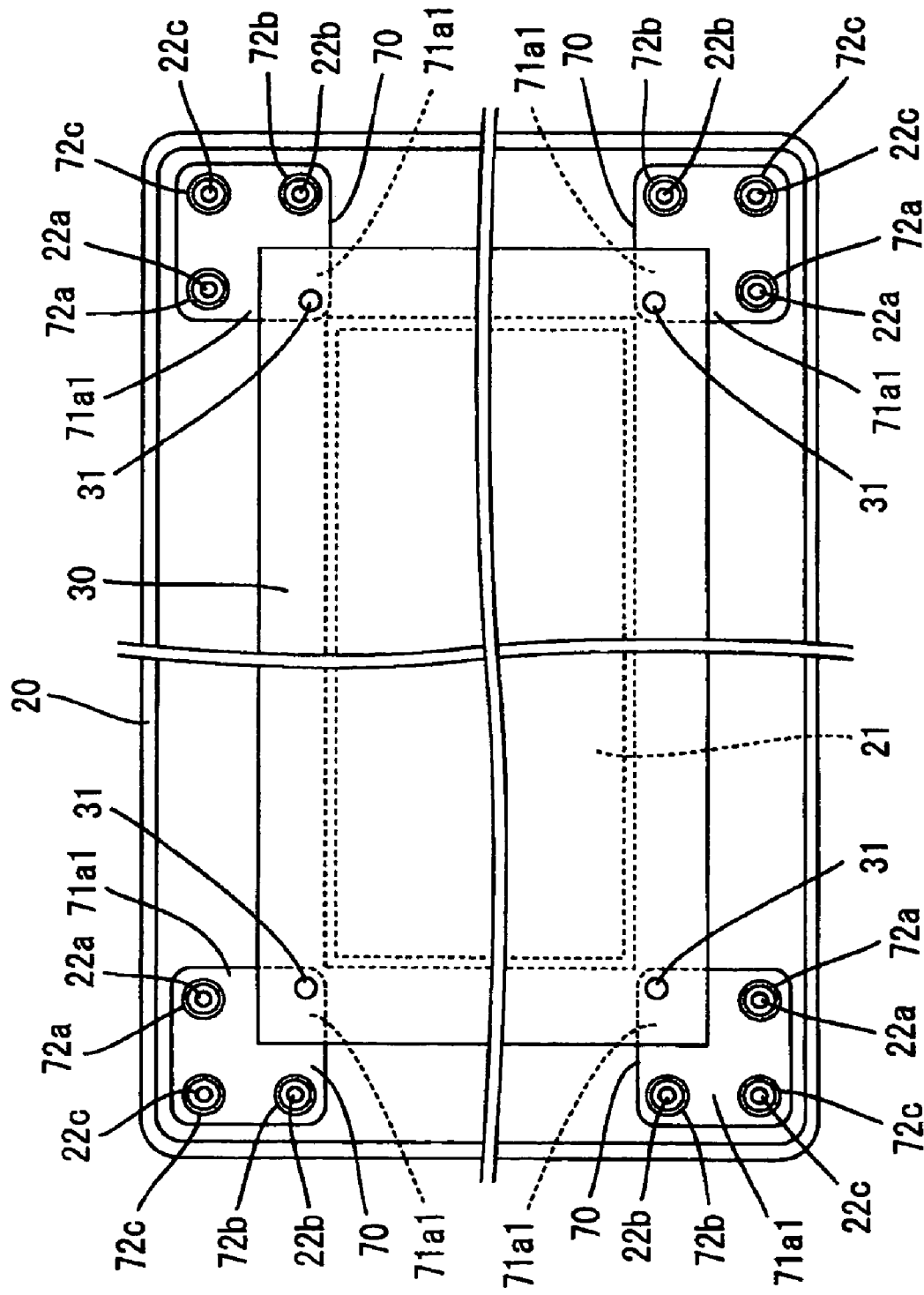
FIG. 9 is an exemplary illustration of a further back view of the front cabinet.

As mentioned above, after the first spacers 70, 70, 70 and 70 are mounted onto the front cabinet 20, the liquid crystal module 40 is put on the front cabinet 20 such that the four corners of the liquid crystal panel 30 are brought into contact with the respective flat parts 71a1, 71a1, 71a1, and 71a1 of the first spacers 70, 70, 70 and 70 from the rear side thereof FIG. 9 illustrates a state in which the liquid crystal module 40 is put, as viewed from the rear side. As shown in the figure, the liquid crystal panel 30 can be put on the cabinet such that it is positioned inside the twelve first mounting cylinders 72a, 72b, 72c, 72a, etc., provided in the respective first spacers 70, 70, 70 and 70 without being interfered with by these cylinders. Furthermore, the flat parts 71a1, 71a1, 71a1 and 71a1 can be brought into contact with the four corners of the liquid crystal panel 30 from the front side thereof. The first spacers 70, 70, 70 and 70 are attached outside the window 21 in such a degree that clearances are formed between side walls of the liquid crystal panel 30 and the first mounting cylinders 72a, 72b, 72c, 72a, etc. At the four corners of the liquid crystal panel 30, recesses 31, 31, 31 and 31 each having a substantially cylindrical shape are formed from the rear side to the front side thereof.

Figure 10:
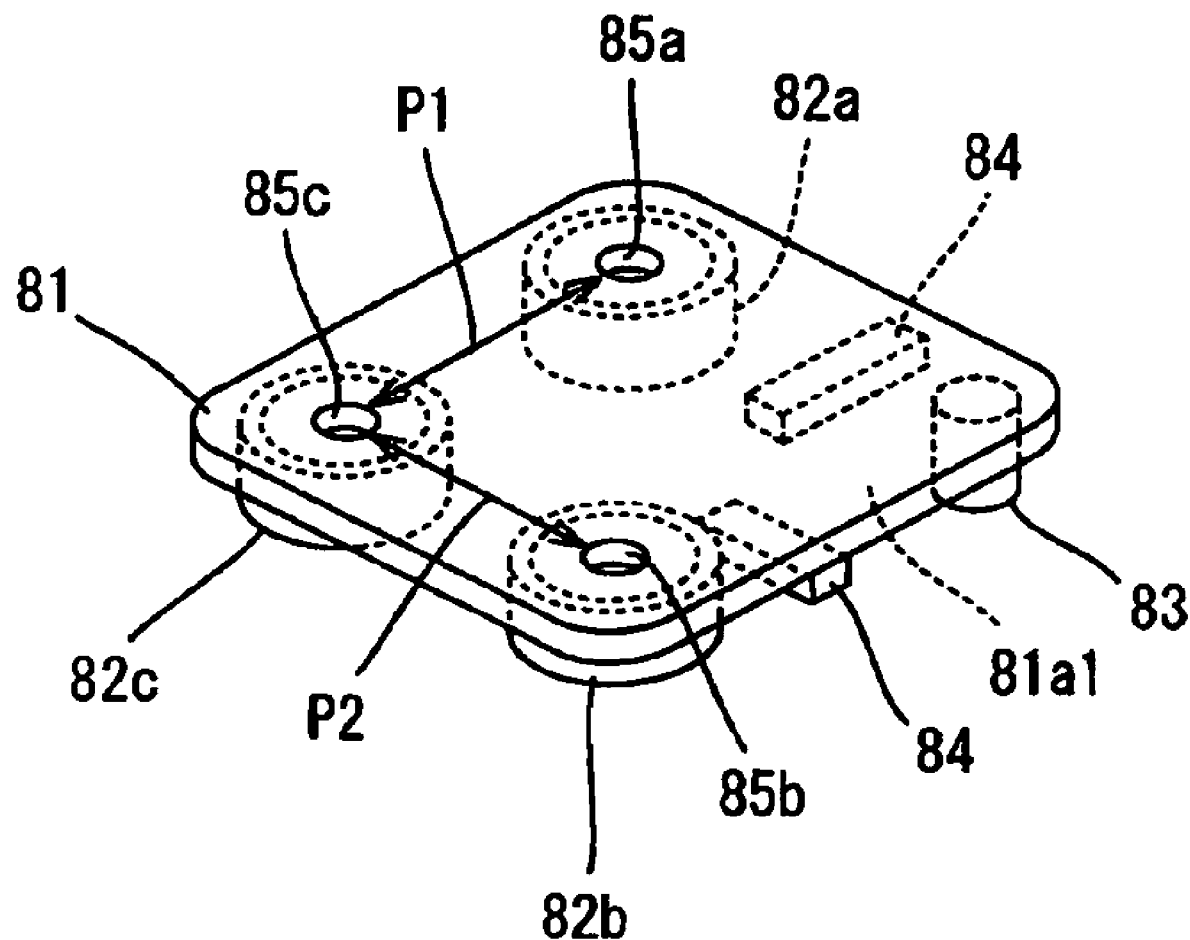
FIG. 10 is an exemplary illustration of a perspective view of a second spacer.

FIG. 10 is a perspective view of one of the second spacers 80, 80, 80 and 80, which is attached outside the right upper corner of the window 21. As shown in the figure, the second spacer 80 has a plate part 81 having a rectangular plate-like shape, and three second mounting cylinders 82a, 82b and 82c are protruded forward from the plate part 81. The second mounting cylinders 82a, 82b and 82c, each of which is formed in a cylindrical shape, have the respective inner diameters slightly larger than the outer diameters of the first mounting cylinders 72a, 72b and 72c. Note that at the height of the plate part 81, screw insertion holes 85a, 85b, and 85c are provided by rendering the inner diameters of the first mounting cylinders 72a, 72b and 72c narrower that the widths of head parts of screws 90a, 90b and 90c. The second spacer 80 is also molded of synthetic resin. The second mounting cylinders 82a, 82b, and 82c are arranged such that connection lines P1 and P2 form a substantially L shape in the same arrangement as that of the bosses 22a, 22b, and 22c, and that of the first mounting cylinders 72a, 72b, and 72c, and such that a distance between the second cylinders arranged is also the same as that between the bosses, and that between the first cylinders. Thus, a flat part 81a1 is formed between the second mounting cylinder 82a and the second mounting cylinder 82b on the plate part 81.

The heights of the second mounting cylinders 82a, 82b, and 82c, and of the bosses 22a, 22b, and 22c, and of the first mounting cylinders 72a, 72b, and 72c are all lower than the height of corners of the liquid crystal panel 30. In the substantial center of the flat part 81a1, a substantially cylindrical fixed protrusion 83 is protruded forward. Two guide parts 84 and 84 having a predetermined height are protruded from between the connection lines P1 and P2 of the flat part 81a1 and the fixed protrusion 83. The guide parts 84 and 84 are formed in an elongated rectangular shape, and have their length directions in parallel to the connection lines P1 and P2, respectively.

Figure 11:
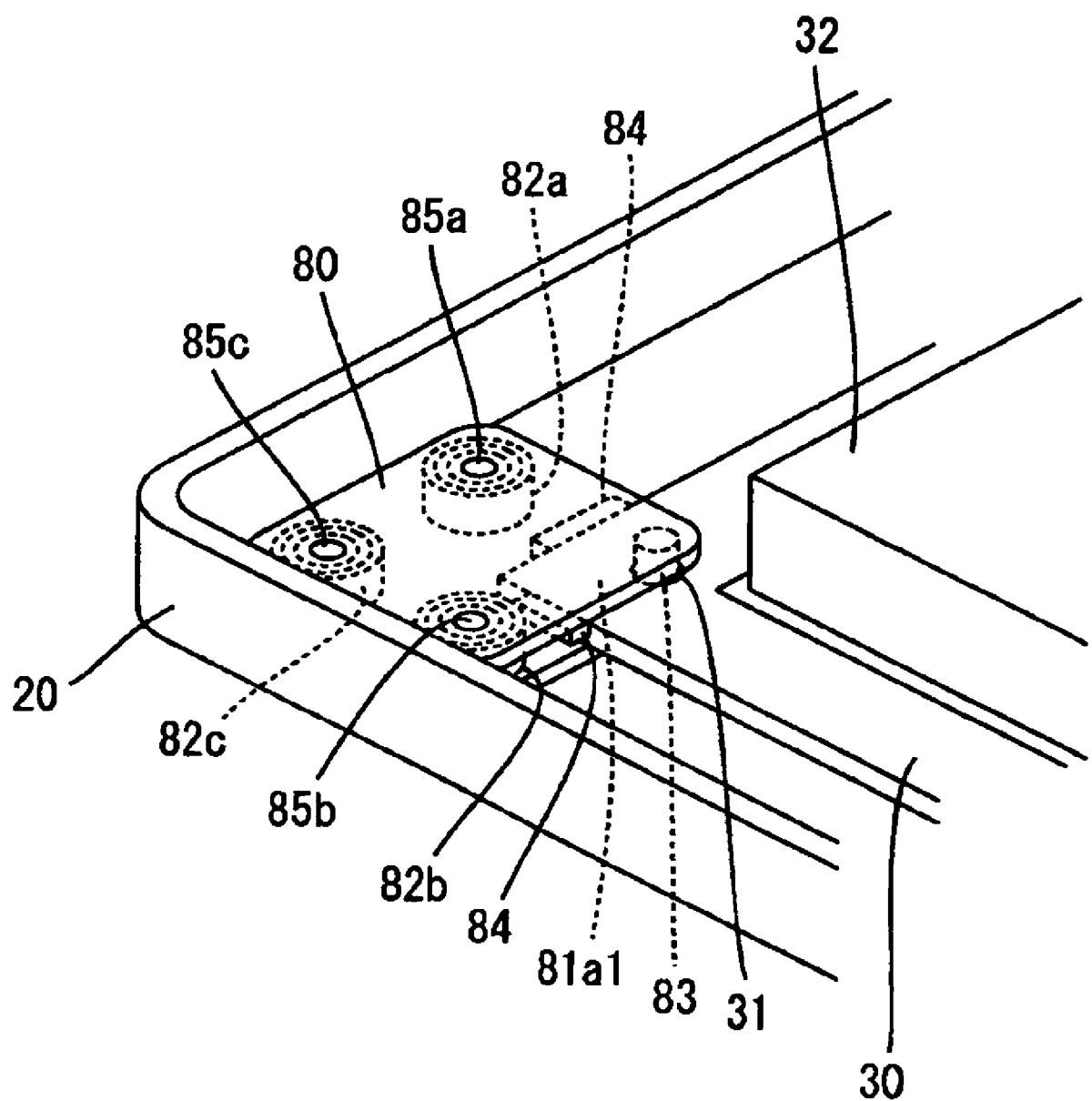
FIG. 11 is an exemplary illustration of a further rear perspective view of the front cabinet.

FIG. 11 illustrates a state in which the second spacer 80 is mounted at the right upper corner of the window 21 of the front cabinet 20. In the figure, the first mounting cylinders 72a, 72b, and 72c are inserted into the second mounting cylinders 82a, 82b, and 82c, respectively. Furthermore, the bosses 22a, 22b, and 22c are inserted in the first mounting cylinders 72a, 72b, and 72c, respectively. It should be noted that since the clearance are formed between the first mounting cylinders 72a, 72b, and 72c, and the liquid crystal panel 30, as mentioned above, the second mounting cylinders 82a, 82b, and 82c do not interfere with the liquid crystal panel 30.

At this time, the second mounting cylinders 82a, 82b, and 82c of the second spacer 80 are positioned outside the window 21, and the flat part 81a1 is brought into contact with the right upper corner of the liquid crystal panel 30 put inside the flat part, from the rear side. That is, the right upper corner of the liquid crystal panel 30 is sandwiched forward and backward between the flat part 71a1 of the first spacer 70 positioned on the front side of the panel and the flat part 81a1 of the second spacer 80 positioned on the back side thereof. At this time, the fixed protrusion 83 is inserted into the recess 31 formed at the right upper corner of the liquid crystal panel 30, while the guide parts 84 and 84 are abutted against the upper and left side walls of the liquid crystal panel 30 from the right side, respectively.

Figure 12:
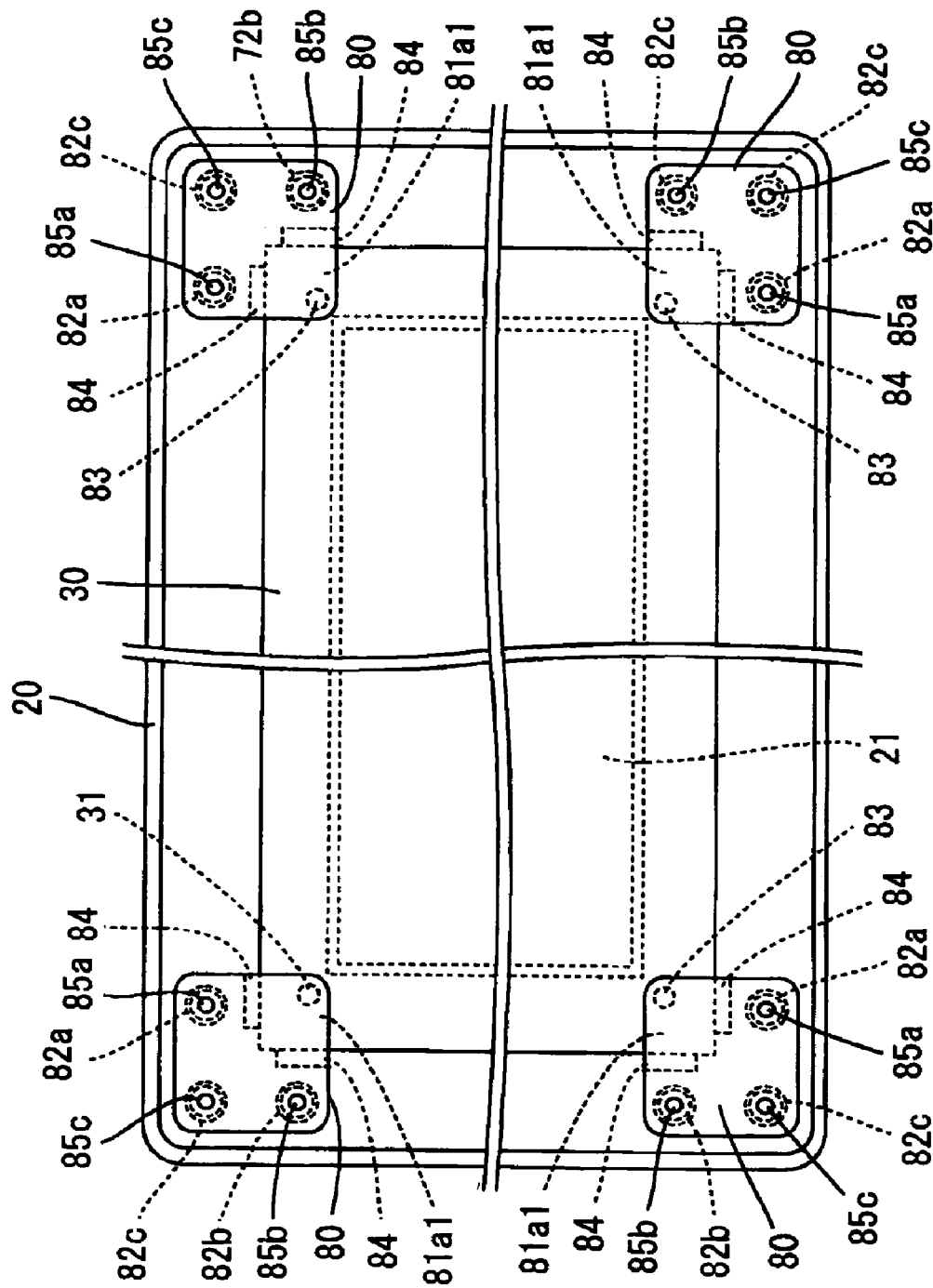
FIG. 12 is an exemplary illustration of a still further back view of the front cabinet.

FIG. 12 illustrates a state in which the second spacers 80, 80, 80, and 80 are mounted, as viewed from the rear side thereof. As shown in the figure, the second spacers 80, 80, 80 and 80 which are formed in a symmetrical shape are mounted in symmetrical directions that orient these spacers symmetrically to one another. And respective flat parts 81a1, 81a1, 81a1 and 81a1 are oriented inward. In this state, the fixed protrusions 83, 83, 83, and 83 respectively formed on the second spacers 80, 80, 80, and 80 are inserted into the recesses 31, 31, 31, and 31 formed at the four corners of the liquid crystal panel 30. The guide parts 84, 84, 84, 84, 84, 84, 84, and 84 formed in pairs on the second spacers 80, 80, 80, and 80 are abutted against the upper, lower, right, and left side walls of the liquid crystal panel 30 so as to sandwich the panel from the outside.

Accordingly, the liquid crystal module 40 is locked from the upper, lower, right, and left sides by the second spacers 80, 80, 80, and 80. Note that since the second spacers 80, 80, 80, and 80 are fixed to certain positions of the front cabinet 20 via the first spacers 70, 70, 70, and 70, the liquid crystal module 40 is fixed to the front cabinet 20 in the upper, lower, right, and left directions. Twelve sets of the bosses 22a, 22b, 22c, etc., the first mounting cylinders 72a, 72b, 72c, etc., and the second mounting cylinders 82a, 82b, 82c, etc., which are fitted into one another, are formed by mounting four pairs of the first spacers 70, 70, 70, and 70, and the second spacers 80, 80, 80, and 80 at the four corners of the liquid crystal panel 30. In a state where the bosses 22a, 22b, 22c, the first mounting cylinders 72a, 72b, 72c, and the second mounting cylinders 82a, 82b, 82c are fitted to one another, the screw holes 22a1, 22b1, 22c1, etc., formed on the bosses 22a, 22b, 22c, etc., are exposed rearward via the screw insertion holes 85a, 85b, 85c, etc.

The screws 90a, 90b, 90c, etc. are screwed into the twelve screw holes 22a1, 22b1, 22c1, etc., exposed rearward, while being inserted into the screw insertion holes 85a, 85b, 85c, etc. This can fasten and fix the first spacers 70, 70, 70, and 70 and the second spacers 80, 80, 80, and 80 together to the front cabinet 20 via the bosses 22a, 22b, 22c, etc., with the screw holes 22a1, 22b1, 22c1, etc. formed therein. Thus, in a state where the liquid crystal panel 30 has its four corners sandwiched between the first spacers 70, 70, 70, and 70, and the second spacers 80, 80, 80, and 80 forward and backward, the first spacers 70, 70, 70, and 70, and the second spacers 80, 80, 80, and 80 are fixed to one another, and also fixed to the front cabinet 20. This disables movement of the liquid crystal panel 30 in front, back, left, and right directions, and thus can fix the liquid crystal module 40 completely. After the fixing of the liquid crystal module 40 is completed, the back side cabinet 25 is attached to the front cabinet 20, thereby sealing the liquid crystal module 40.

(3) Overview

As mentioned above, in the invention, the liquid crystal panel 30 has its corners sandwiched between the first and second spacers 70 and 80 forward and backward, and the first and second spacers 70 and 80 are fixed to the front cabinet 20. Thus, the front cabinet 20 can be used as a general-purpose member. That is, if the first spacer 70 or the second spacer 80 is designed to fit to the shape of the liquid crystal panel 30, the front cabinet 20 does not need to be modified every time the shape of the liquid crystal panel 30 is modified. Particularly, in the present embodiment, since the corners of the liquid crystal panel 30 are sandwiched on the flat part 71a1 of the first spacer 70, even if the size of the liquid crystal panel 30 is changed to some extent, the first spacer 70 can cause the flat part 71a1 to be brought into contact with the corners of the panel 30. In short, since in the embodiment, only the modification of the fixed protrusion 83 of the second spacer 80 and of the guide parts 84 and 84 can deal with the change in size of the liquid crystal panel 30, the first spacer 70 can also be used as a general-purpose member. It should be noted that when the shape of the liquid crystal panel 30 is significantly modified, both the first spacer 70 and the second spacer 80 may be modified.

Since the first spacer 70 and the second spacer 80 are made of synthetic resin, the design of these spacers can be modified with flexibility. Furthermore, even if the spacer is manufactured as a member dedicated to a specific liquid crystal panel 30, the costs will not increase significantly. The liquid crystal panel 30 is fixed by being sandwiched between four pairs of the first spacers 70, 70, 70, 70 and the second spacers 80, 80, 80, 80, which are disposed at the four corners of the panel 30, and hence the liquid module 40 can be held securely even while the liquid crystal television 10 is standing. In particular, the fixed protrusion 83 is inserted in the recess 31, and the guide parts 84 and 84 sandwich the side walls of the liquid crystal panel 30 from the outside, thereby preventing displacement of the liquid crystal panel 30 or the like.

Each of the first spacers 70, 70, 70, and 70, and each of the second spacers 80, 80, 80, and 80 are respectively fixed with three screws 90a, 90b, 90c, so that the liquid crystal module 40 can be held securely Since the number of bosses 22a, 22b, 22c, etc. on which the load of the liquid crystal module 40 is concentrated is 12 in total, the load can be distributed, thereby preventing the breakage of the bosses 22a, 22b, 22c. Note that since the first spacers 70, 70, 70, and 70, and the second spacers 80, 80, 80, and 80 can be fastened together with the screws 90a, 90b, 90c, etc., an operation of screwing is not complicated.

The first mounting cylinders 72a, 72b, 72c, etc., and the second mounting cylinders 82a, 82b, 82c, etc., surround the outer periphery of the bosses 22a, 22b, 22c, etc., on which the load of the liquid crystal module 40 is concentrated. This can improve the strength of the bosses 22a, 22b, 22c, etc. The substantially plate-like plate parts 71 and 81 included in the first spacer 70 and the second spacer 80 can distribute the load of the liquid crystal module 40 over a wide range by coming into wide contact with the liquid crystal panel 30 and the front cabinet 20. Therefore, with this arrangement, the liquid crystal module 40 with the large-sized liquid crystal panel 30, a plasma display module, or the like can be supported sufficiently.

Although the invention has been described in considerable detail in language specific to structural features and or method acts, it is to be understood that the invention defined in the appended claims is not necessarily limited to the specific features or acts described. Rather, the specific features and acts are disclosed as preferred forms of implementing the claimed invention. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

What is claimed is:

1. A panel display television including a panel-like display module exposed forward from a substantially rectangular window provided in a front cabinet, the panel display television comprising:
- bosses provided in said front cabinet, said three bosses being protruded rearward outside each of four corners of the window of the front cabinet in a columnar shape, a connection line connecting the adjacent bosses being in a substantially L shape along the corner;
- a first spacer mounted at each of the four corners of said window, said first spacer including three first mounting cylinders having a substantially cylindrical shape and protruded rearward at each corner, into which the three bosses disposed at each corner are respectively inserted, said first spacer being made of synthetic resin and adapted to be brought into contact with the corner of said display module from a front side thererof;
- a second spacer provided corresponding to said first spacer disposed at each of the four corners of the window, said second spacer being made of synthetic resin and adapted to be brought into contact with the corner of the display module from a rear side thereof, and thereby sandwiching the corner of the display module together with the first spacer opposed thereto, said second spacer including:
- second mounting cylinders having a substantially cylindrical shape and protruded forward, into which the three first mounting cylinders disposed in the first spacer opposed to the second spacer are respectively inserted;
- a guide part capable of being abutted against a side wall of the display module; and
- a fixed protrusion capable of being inserted into a recess formed on the display module; and
- screws adapted to be screwed into said bosses, while fastening together the first and second spacers opposed to each other.

2. A panel display device including a panel-like display module exposed forward from a substantially rectangular window provided in a front cabinet, the panel display device comprising:
- a boss provided outside a corner of said window in the front cabinet;
- a first spacer mountable to the boss and adapted to be brought into contact with the corner of the display module from a front side thereof;
- said first spacer is provided with a first mounting cylinder having a substantially cylindrical shape, into which the boss protruded rearward is inserted;
- a second spacer adapted to be brought into contact with the corner of the display module from a rear side thereof, for sandwiching the corner of the display module together with the first spacer;
- said second spacer is provided with a second mounting cylinder having a substantially cylindrical shape, into which the first mounting cylinder protruded forward is inserted; and
- a screw adapted to be screwed into said boss, while fastening together the first and second spacers.

3. The panel display device according to claim 2, wherein said first or second spacer is provided with a guide part capable of being abutted against a side wall of the display module.

4. The panel display device according to claim 2, wherein said first or second spacer is provided with a fixed protrusion capable of being inserted into a recess formed on the display module.

5. The panel display device according to claim 2, wherein a pair of the first and second spacers is provided with three sets of the bosses, the first and second mounting cylinders, and the screws.

6. The panel display device according to claim 5, wherein a connection line connecting said three bosses provided in said one pair of the first and second spacers forms a substantially L shape along the corner of the window.

7. The panel display device according to claim 2, wherein four pairs of said first and second spacers are provided at the four corners of the window.

8. The panel display device according to claim 2, wherein the first or second spacer is made of synthetic resin.

* * * * *